United States Patent
Hisamoto

(10) Patent No.: US 9,871,961 B2
(45) Date of Patent: Jan. 16, 2018

(54) IMAGE PROCESSING APPARATUS AND IMAGE PROCESSING METHOD GENERATING A TIME-LAPSE MOVING IMAGE

(71) Applicant: CANON KABUSHIKI KAISHA, Tokyo (JP)

(72) Inventor: Shinji Hisamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/150,988

(22) Filed: May 10, 2016

(65) Prior Publication Data
US 2016/0337577 A1 Nov. 17, 2016

(30) Foreign Application Priority Data
May 14, 2015 (JP) ................................ 2015-099419

(51) Int. Cl.
H04N 5/232 (2006.01)
H04N 5/235 (2006.01)
H04N 5/77 (2006.01)

(52) U.S. Cl.
CPC ....... *H04N 5/23212* (2013.01); *H04N 5/2356* (2013.01); *H04N 5/23245* (2013.01); *H04N 5/772* (2013.01)

(58) Field of Classification Search
CPC .. H04N 5/23212; H04N 5/772; H04N 5/2356; H04N 5/23245
See application file for complete search history.

(56) References Cited

U.S. PATENT DOCUMENTS

| 4,410,804 A | 10/1983 | Stauffer | |
|---|---|---|---|
| 2002/0008917 A1* | 1/2002 | Daniell | G02B 3/005 |
| | | | 348/E13.028 |
| 2013/0222633 A1* | 8/2013 | Knight | H04N 5/23293 |
| | | | 348/222.1 |

(Continued)

FOREIGN PATENT DOCUMENTS

| JP | 2001-083407 A | 3/2001 |
|---|---|---|
| JP | 2013-062740 A | 4/2013 |

OTHER PUBLICATIONS

Ng et al. "Light Field Photography with a hand-held Plenoptic Camera" Stanford Tech Report CTSR Feb. 2005; Apr. 20, 2005 (11 pgs).

*Primary Examiner* — Gevell Selby
(74) *Attorney, Agent, or Firm* — Cowan, Liebowitz & Latman, P.C.

(57) ABSTRACT

An image processing method including specifying a first focusing position for a first frame of a plurality of frames forming a time-lapse moving image; acquiring a first parallax image and a second parallax image, which are contained in a first image file corresponding to the first frame, from a recording medium; calculating a first shift amount for a first focusing position shift to be performed on the first parallax image and the second parallax image for focusing on the first focusing position; performing the first focusing position shift with the first shift amount on the first parallax image and the second parallax image, and combining the first parallax image and the second parallax image after the first focusing position shift to generate a first refocused image; and replacing the first frame by the first refocused image to regenerate the time-lapse moving image.

11 Claims, 11 Drawing Sheets

(56) References Cited

U.S. PATENT DOCUMENTS

| | | | |
|---|---|---|---|
| 2013/0223659 A1* | 8/2013 | Zhen .................... | H03F 3/68 |
| | | | 381/309 |
| 2014/0028869 A1* | 1/2014 | Hatakeyama .......... | H04N 5/232 |
| | | | 348/222.1 |
| 2016/0021298 A1* | 1/2016 | Tsutsumi ................ | G06T 7/593 |
| | | | 348/349 |

* cited by examiner

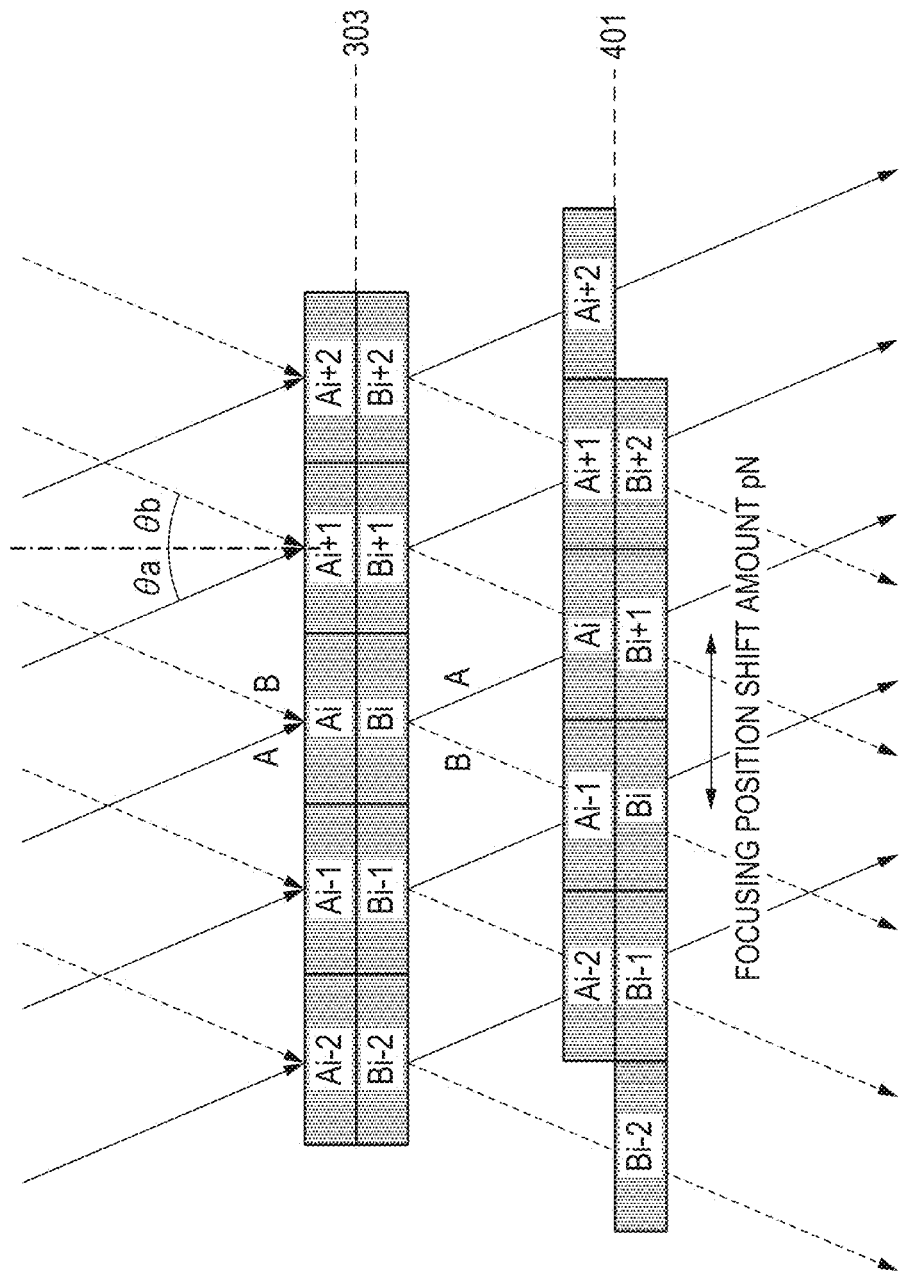

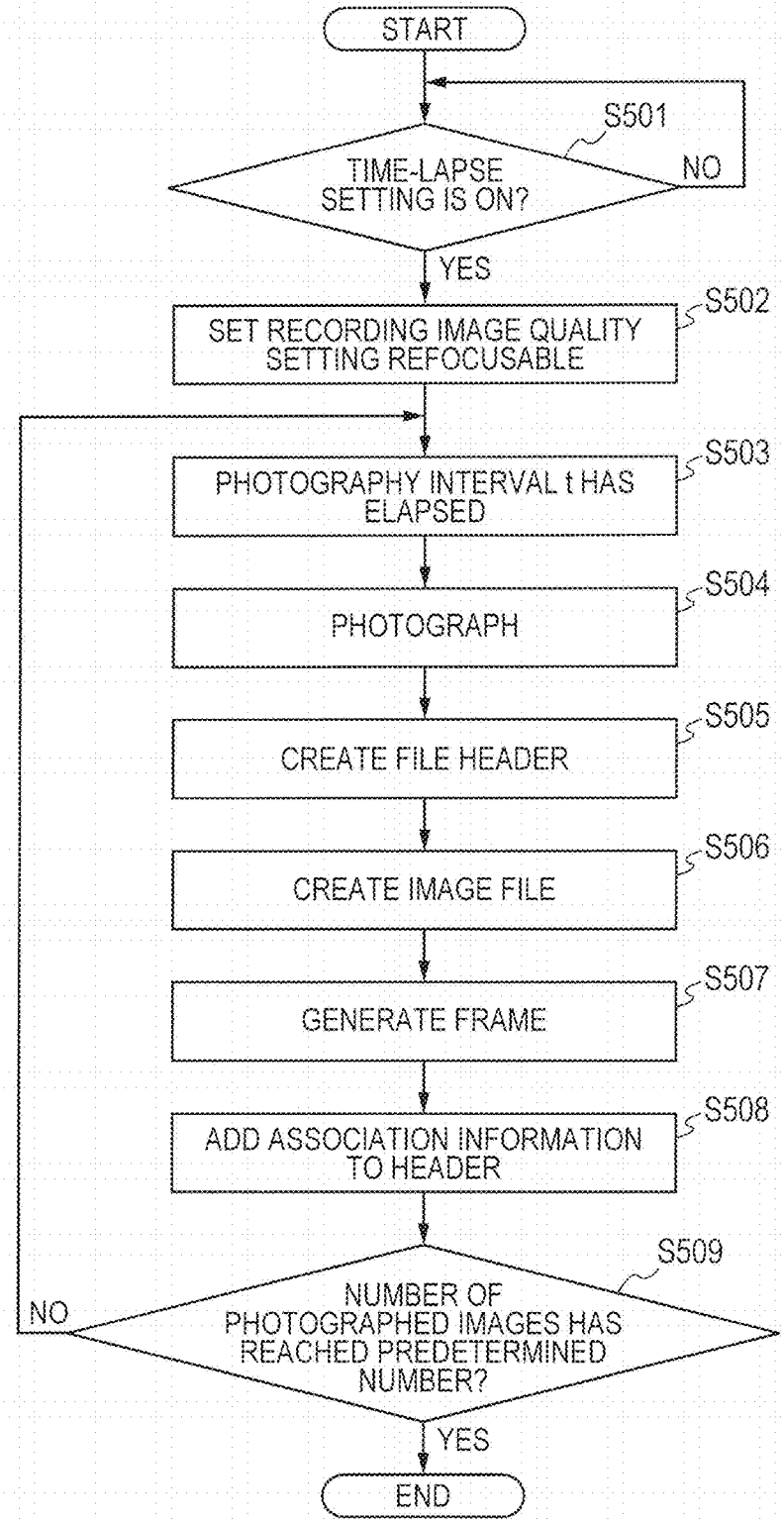

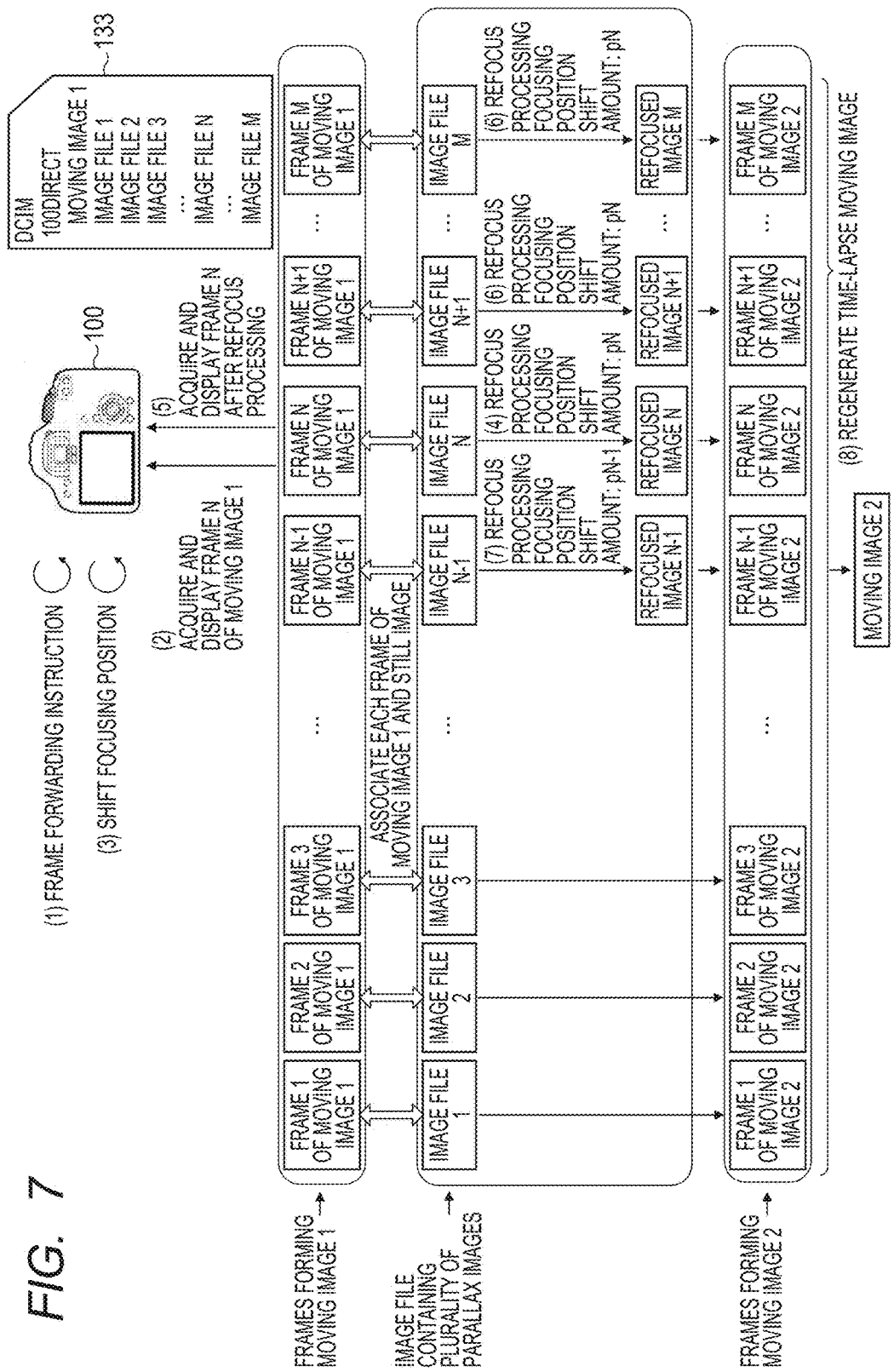

IMAGE PROCESSING APPARATUS AND IMAGE PROCESSING METHOD GENERATING A TIME-LAPSE MOVING IMAGE

BACKGROUND OF THE INVENTION

Field of the Invention

The present disclosure relates to an image processing apparatus and an image processing method.

Description of the Related Art

One focus detection method for an image pickup apparatus is an image pickup plane phase difference method in which focus detection in a phase difference method is performed by a focus detection pixel formed on an image pickup element.

In U.S. Pat. No. 4,410,804, there is disclosed an image pickup apparatus using a two-dimensional image pickup element in which one microlens and a plurality of photoelectric converters obtained by a division are formed for one pixel. The photoelectric converters obtained by the division are configured to receive light from different regions of the exit pupil of the photographing lens via one microlens to divide the pupil. Respective parallax signals obtained by receiving the light by the photoelectric converters obtained by the division may be used to obtain an image shift amount, thereby being capable of performing focus detection in a phase difference method. In Japanese Patent Application Laid-Open No. 2001-083407, there is disclosed adding parallax signals, which are obtained by receiving light by photoelectric converters obtained by a division, to thereby generate a captured image signal.

A plurality of photographed parallax signals are equivalent to Light Field (LF) data, which is information on a space distribution and an angle distribution of light intensities. In Ren Ng, et. Al., "Light Field Photography with a Hand-held Plenoptic Camera", Stanford Tech Report CTSR 2005-02, pp. 1-11 (2005), there is disclosed a refocusing technology technique in which a synthetic image at a virtual imaging plane, which is different from an image pickup plane, is rendered by using acquired LF data to change a focus position of the captured image after photographing.

Meanwhile, there is an image pickup apparatus having a function called time-lapse photography (interval photography) for observing a change with time of an object. In the time-lapse photography, an operator specifies photography interval, and every time the photography interval elapses, the image pickup apparatus photographs and records a picture. In Japanese Patent Application Laid-Open No. 2013-062740, there is disclosed a time-lapse photography technique in which, every time the time-lapse photography is performed, an acquired image is output as an image file, and a time-lapse moving image (also known as "time-lapse movie") file containing the acquired image as one frame of a moving image is generated.

However, in the related art, it has been impossible to perform refocus processing on a time-lapse moving image.

SUMMARY OF THE INVENTION

According to an aspect of an embodiment, there is provided an image processing apparatus including a focusing position specification unit configured to specify a first focusing position for a first frame of a plurality of frames forming a time-lapse moving image; a parallax image acquisition unit configured to acquire a first parallax image and a second parallax image, which are contained in a first image file corresponding to the first frame, from a recording medium; a shift amount calculation unit configured to calculate a first shift amount for a first focusing position shift to be performed on the first parallax image and the second parallax image for focusing on the first focusing position; a refocused image generation unit configured to perform the first focusing position shift with the first shift amount on the first parallax image and the second parallax image, and to combine the first parallax image and the second parallax image after the first focusing position shift to generate a first refocused image; and a time-lapse moving image generation unit configured to replace the first frame by the first refocused image to regenerate the time-lapse moving image.

According to another aspect of an embodiment, there is provided an image processing method including specifying a first focusing position for a first frame of a plurality of frames forming a time-lapse moving image; acquiring a first parallax image and a second parallax image, which are contained in a first image file corresponding to the first frame, from a recording medium; calculating a first shift amount for a first focusing position shift to be performed on the first parallax image and the second parallax image for focusing on the first focusing position; performing the first focusing position shift with the first shift amount on the first parallax image and the second parallax image, and combining the first parallax image and the second parallax image after the first focusing position shift to generate a first refocused image; and replacing the first frame by the first refocused image to regenerate the time-lapse moving image.

Further features of the present invention will become apparent from the following description of exemplary embodiments with reference to the attached drawings.

BRIEF DESCRIPTION OF THE DRAWINGS

FIG. 4 is a diagram for schematically illustrating refocus processing.

FIG. 5 is a flow chart for illustrating operation during time-lapse photography in the image processing apparatus according to the first embodiment.

FIG. 7 is a diagram for schematically illustrating the editing of the time-lapse moving image in the image processing apparatus according to the first embodiment.

DESCRIPTION OF THE EMBODIMENTS

Embodiments of the present invention are described below in detail with reference to the drawings. However, the present invention is not limited to the following embodiments. The following embodiments are not to limit the invention as defined in the appended claims, and not all of combinations of features described in the following embodiments are indispensable to the solving means of the present invention.

First Embodiment

An image processing apparatus, an image processing method, and a computer program according to a first embodiment are described with reference to the drawings.

[Overall Structure]

Figure 1:
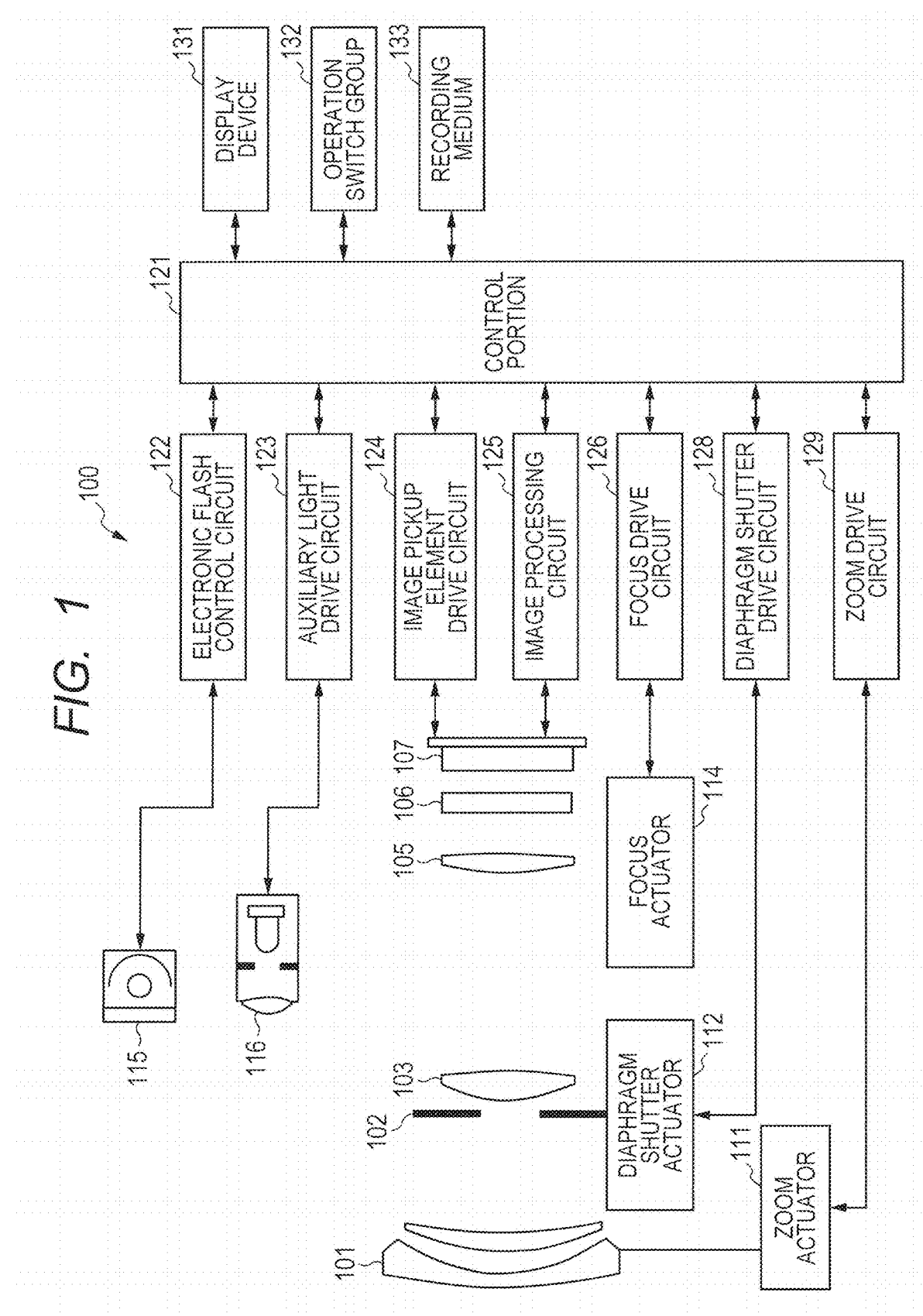
FIG. 1 is a schematic diagram for illustrating the overall structure of an image processing apparatus according to a first embodiment.

First, the overall structure of the image processing apparatus according to this embodiment is described with reference to FIG. 1. FIG. 1 is a diagram for illustrating the overall structure of the image processing apparatus according to this embodiment. An image processing apparatus 100 according to this embodiment is, for example, an image processing apparatus having an image pickup function, that is, an image pickup apparatus, and more specifically, is a digital camera. As illustrated in FIG. 1, a first lens group 101 is arranged at a distal end portion of an imaging optical system, and the first lens group 101 is held to be retractably extendable in an optical axis direction. A diaphragm shutter 102 is configured to not only adjust its aperture diameter to perform a light amount adjustment during photography, but also function as a shutter for adjusting exposure time in seconds during still image photography. The diaphragm shutter 102 and a second lens group 103 are configured to be integrally extended or retracted in the optical axis direction to exert a magnification varying action (zoom function) in conjunction with the extending/retracting operation of the first lens group 101.

A third lens group 105 is configured to be extended or retracted in the optical axis direction to perform a focus adjustment. An optical low-pass filter 106 is an optical element configured to reduce false color and moire in a photographed image. An image pickup element 107 includes a two-dimensional complementary metal-oxide-semiconductor (CMOS) photosensor and a peripheral circuit, and is arranged on an imaging plane of the imaging optical system. The image pickup element 107 includes an array of a plurality of pixels 200R, 200G, and 200B each including a plurality of subpixels 201 and 202, which are configured to receive light fluxes passing through different partial pupil regions 301 and 302 (see FIG. 3) of the imaging optical system.

A zoom actuator 111 is configured to rotate a cam barrel (not shown) to drive the first lens group 101 to the third lens group 105 to extend or retract in the optical axis direction and hence perform a magnification varying operation. A diaphragm shutter actuator 112 is configured to control the aperture diameter of the diaphragm shatter 102 to adjust the amount of light during photography, and perform an exposure time control during still image photography. A focus actuator 114 is configured to drive the third lens group 105 to extend or retract in the optical axis direction and hence adjust the focus.

An illumination unit (electronic lash for illuminating an object) 115 for use during photography is preferably a photoflash device using a xenon tube, but an illumination device including a light emitting diode (LED) that sequentially emits light may also be used. An auto-focus (AF) auxiliary light unit 116 is configured to project an image of a mask having a predetermined aperture pattern on an object through a transmitter lens to improve focus detection capability for a dark object or an object having a low contrast.

A control portion 121 is configured to perform various kinds of control in the image processing apparatus (image pickup apparatus) 100, and includes a central processing unit (CPU; arithmetic portion), read-only memory (ROM), a random access memory (RAM), an analog-to-digital (A/D) converter, a digital-to-analog (D/A) converter, a communication interface circuit, and the like, which are not shown. The control portion 121 is configured to drive various circuits in the image processing apparatus 100 based on a predetermined program stored in the ROM to execute a series of operations including AF, the photography, image processing, recording, and the like. The control portion 121 is configured to function as an image processing unit.

An electronic flash control circuit 122 is configured to perform a control to turn on the illumination unit 115 in synchronization with a photographing operation. An auxiliary light drive circuit 123 is configured to perform a control to turn on the AR auxiliary light unit 116 in synchronization with a focus detection operation. An image pickup element drive circuit 124 is configured to control an image pickup operation of the image pickup element 107, and subject an acquired image signal to an A/D conversion to be transmitted to the control portion 121. An image processing circuit 125 is configured to perform processing such as gamma (γ) conversion, color interpolation, and JPEG compression on an image acquired by the image pickup element 107.

A focus drive circuit 126 is configured to perform a control to drive the focus actuator 114 based on a result of the focus detection, and drive the third lens group 105 to extend or retract in the optical axis direction, thereby adjusting the focus. A diaphragm shutter drive circuit 128 is configured to perform a control to drive the diaphragm shutter actuator 112, and hence control the aperture of the diaphragm shutter 102. A zoom drive circuit 129 is configured to drive the zoom actuator 111 in response to a zoom operation by a photographer.

A display device 131 is formed of a liquid crystal display (LCD), for example, and is configured to display information on a photography mode of the image processing apparatus 100, a preview image before the photography, an image for confirmation after the photography, a display image in an in-focus state during' focus detection, and the like. The display device 131 is configured to also display, during reproduction and editing of a time-lapse moving image, each frame of the moving image or an image after refocusing. An operation switch group 132 includes a power switch, a release (photography trigger) switch, a zoom operation switch, a photography mode selection switch, and the like. The operation switch group 132 also includes operation switches for issuing instructions to forward frames in the moving image, and to shift a focusing position during the reproduction and the editing of the time-lapse moving image. A recording medium. 133 is a removably mountable flash memory or the like. The recording medium 133 is configured to record time-lapse images acquired by the photography, a plurality of image files each corresponding to each frame of the time-lapse images, and each containing a plurality of parallax images, the time-lapse moving image after the editing, and the like.

[Image Pickup Element]

Figure 2:
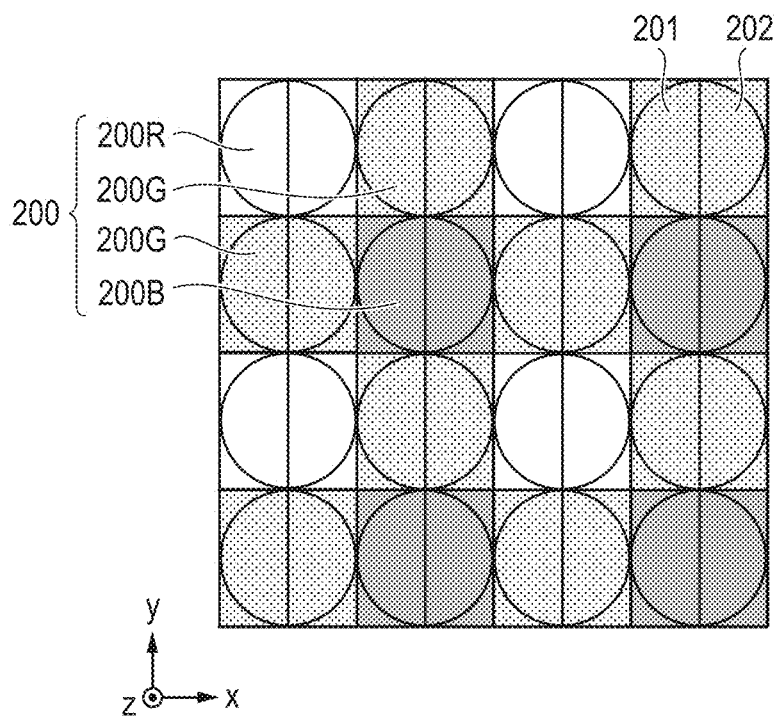
FIG. 2 is a schematic diagram for illustrating a pixel array in an image pickup element of the image processing apparatus according to the first embodiment.

Next, the image pickup element mounted in the image processing apparatus according to this embodiment is described with reference to FIG. 2. FIG. 2 is a schematic diagram for illustrating a pixel array of the image pickup element mounted in the image processing apparatus according to this embodiment.

As the image pickup element 107, a two-dimensional CMOS sensor is used. In FIG. 2, a pixel array in the image pickup element 107, which is extracted in a range of four columns and four rows, is illustrated. In other words, in FIG. 2, a subpixel array in the image pickup element 107, which is extracted in a range of eight columns and four rows, is illustrated.

As illustrated in FIG. 2, in pixel groups 200 each including two columns and two rows, a pixel 200R having a spectral sensitivity of red (R) is arranged at the upper left, pixels 200G having a spectral sensitivity of green (G) are arranged at the upper right and lower left, and a pixel 200B having a spectral sensitivity of blue (B) is arranged at the lower right. Each of the pixels 200R, 200G, and 200B is formed of the subpixel 201 and the subpixel 202, which are arranged in two columns and one row.

A large number of pixels in four columns and four rows (subpixels in eight columns and four rows) as illustrated in FIG. 2 are arranged on a light receiving surface, and hence the image pickup element 107 may acquire a captured image and a focus detection signal.

In this embodiment, received optical signals of the subpixels 201 of the pixels of the image pickup element 107 are collected to generate a first parallax image, and received optical signals of the subpixels 202 of the pixels of the image pickup element 107 are collected to generate a second parallax image. In this embodiment, based on images acquired by the pixels of the image pickup element 107, a plurality of parallax images (parallax image pair) are generated for the different partial pupil regions 301 and 302 (see FIG. 3), respectively.

Moreover, the signal of the subpixel 201 and the signal of the subpixel 202 are added and read for each of the pixels of the image pickup element 107 to generate a captured image having a resolution of the number of effective pixels. In other words, in this embodiment, the captured image is generated based on the plurality of parallax images (first parallax image and second parallax image).

[Relationship Between Defocus Amount and Image Shift Amount]

Figure 3:
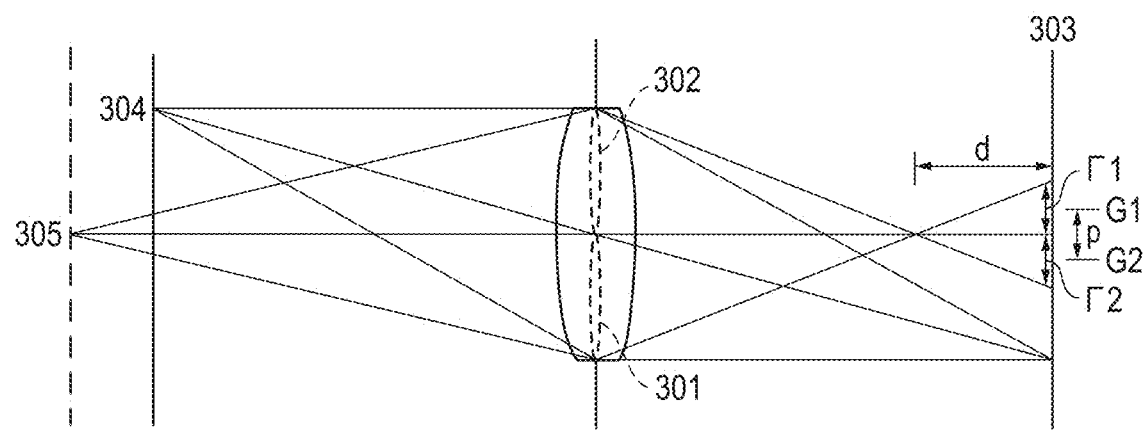
FIG. 3 is a schematic diagram for illustrating a relationship between a defocus amount and an image shift amount.

Next, a relationship between a defocus amount and an image shift amount is described with reference to FIG. 3. FIG. 3 is a schematic diagram for illustrating the relationship between the defocus amount and the image shift amount.

The defocus amount is a distance from a position at which an image of the object is formed to an image pickup plane 303, and is denoted by a reference symbol d. A magnitude of the defocus amount is |d|. In a state in which the position at which the image of the object is formed is on the object side with respect to the image pickup plane 303, that is, a front focus state, the defocus amount d is negative (d<0). On the other hand, in a state in which the position at which the image of the object is formed is on the side opposite to the object side with respect to the image pickup plane 303, that is, a rear focus state, the defocus amount d is positive (d>0). In a state in which the position at which the image of the object is formed is on the image pickup plane 303, that is, the in-focus state, the defocus amount d is 0. In FIG. 3, a position of the object corresponding to the in-focus state (d=0) is indicated by the reference numeral 304, and a position of the object corresponding to the front focus state (d<0) is indicated by the reference numeral 305. Note that, both of the front focus state (d<0) and the rear focus state (d>0) are defocused states (|d|>0).

In the front focus state (d<0), of light fluxes from the object 305, the light flux that has passed through the partial pupil region 301 is once collected, is then diverged in a range of a width $\Gamma 1$ with a center of gravity G1 of the light flux being the center, and becomes a blurred image at the image pickup plane 303. The blurred image is received by the subpixels 201 forming the pixels arranged on the image pickup element 107 to generate the first parallax image. Moreover, in the front focus state (d<0), of the light fluxes from the object 305, the light flux that has passed through the partial pupil region 302 is once collected, is then diverged in a range of a width $\Gamma 2$ with a center of gravity G2 of the light flux being the center, and becomes a blurred image at the image pickup plane 303. The blurred image is received by the subpixels 202 forming the pixels arranged on the image pickup element 107 to generate the second parallax image. Therefore, the first parallax image is recorded as an object image in which the object 305 is blurred over the width $\Gamma 1$ at the center of gravity G1 on the image pickup plane 303. Similarly, the second parallax image is recorded as an object image in which the object 305 is blurred over the width $\Gamma 2$ at the center of gravity G2 on the image pickup plane 303. The blur widths $\Gamma 1$ and $\Gamma 2$ of the object images are increased substantially in proportion to an increase in magnitude |d| of the defocus amount d. Similarly, a magnitude |p| of an image shift amount p (=difference between centers of gravity of light fluxes: G1-G2) of the object images between the first parallax image and the second parallax image is also increased substantially in proportion to the increase in magnitude |d| of the defocus amount d. In the rear focus state (d>0), a direction of image shift of the object images between the first parallax image and the second parallax image is the direction opposite to that in the case of the front focus state, but the rear focus state is similar to the case of the front focus state other than the direction of image shift.

As described above, with the increase in magnitude of the defocus amount, the magnitude of the image shift amount between the first parallax image and the second parallax image is increased. In other words, with the increase in magnitude of the defocus amount of captured image signals, which are obtained by adding the first parallax image and the second parallax image, the magnitude of the image shift amount between the first parallax image and the second parallax image is also increased.

[Refocusing]

Next, refocusing is described with reference to FIG. 4. FIG. 4 is a diagram for schematically illustrating refocus processing performed in the image processing apparatus according to this embodiment. In FIG. 4, the refocus processing in a pupil division direction (column direction) using the plurality of parallax images, that is, the first parallax image and the second parallax image is schematically illustrated. The image pickup plane 303 illustrated in FIG. 4 corresponds to the image pickup plane 303 illustrated in FIG. 3. In FIG. 4, the first parallax image obtained by the i-th pixel in the column direction, which is arranged on the image pickup plane 303 of the image pickup element 107, is schematically represented by Ai, and the second parallax image obtained by the i-th pixel in the column direction is schematically represented by Bi, where i is an integer. The first parallax image Ai is a received optical signal of a light flux that has entered the i-th pixel at a principal ray angle θa. The light flux entering the i-th pixel at the principal ray angle θa corresponds to the light flux that has passed through the partial pupil region 301 illustrated in FIG. 3. The second parallax image Bi is a received optical signal of a light flux that has entered the i-th pixel at a principal ray angle θb. The light flux entering the i-th pixel at the principal ray angle θb corresponds to the light flux that has passed through the partial pupil region 302 illustrated in FIG. 3.

The first parallax image Ai and the second parallax image Bi contain not only light intensity distribution information but also incident angle information. Therefore, the first parallax image Ai and the second parallax image hi may be translated to a virtual imaging plane 401 along the angle θa and the angle θb, respectively, and added to generate a refocused signal at the virtual imaging plane 401. Translating the first parallax image Ai to the virtual imaging plane 401 along the angle θa corresponds to shifting the first parallax image Ai by +0.5 pixel in the column direction. Translating the second parallax image Bi to the virtual imaging plane 401 along the angle θb corresponds to shifting the second parallax image hi by −0.5 pixel in the column direction. Therefore, the first parallax image Ai and the second parallax image Bi may be relatively shifted by +1 pixel, and Ai and Bi+1 may be associated and added to generate the refocused signal at the virtual imaging plane 401. Similarly, the first parallax image Ai and the second parallax image Bi may be shifted by an integer number of pixels and added to generate a shift-and-add signal (refocused signal) at each virtual imaging plane 401 corresponding to the shift amount of the integer number of pixels.

[Time-Lapse Photography]

Next, time-lapse photography performed by the image processing apparatus according to this embodiment is described with reference to FIG. 5. FIG. 5 is a flow chart for illustrating operation during the time-lapse photography in the image processing apparatus according to this embodiment. Steps illustrated in FIG. 5 are executed by the control portion 121 of the image processing apparatus 100 according to this embodiment.

First, before starting the photography, it is previously determined whether or not the photography mode is set to a time-lapse photography mode. Setting the time-lapse photography mode ON/OFF is performed by a user operating the operation switch group 132. In a case where the photography mode is not set to the time-lapse photography mode (NO in Step S501), that is, in a case where the photography mode is a normal photography mode, Step S501 is repeatedly performed. In the normal photography mode, combining processing is performed on the plurality of parallax images output from the image pickup element 107, and a combined image is recorded on the recording medium 133. In the normal photography mode, the control portion 121 is configured to function as a combined image file generation unit configured to record a combined image file, which is formed by combining the plurality of parallax images obtained from the image pickup element 107, on the recording medium 133. On the other hand, in a case where the photography mode is set to the time-lapse photography mode (YES in Step S501), the processing proceeds to Step S502.

In Step S502, a recording image quality setting is set to refocusable image quality. This causes a refocusable image to be recorded on the recording medium 133.

In Step S503, the control portion 121 waits for a preset predetermined photography interval t to elapse. The photography interval t may be previously set before the photography is started by the user operating the operation switch group 132.

In Step S504, the photography is performed with the elapse of the photography interval t to acquire the plurality of parallax images, that is, the first parallax image and the second parallax image.

In Step S505, a file header of the photographed image is created, and a refocusable flag indicating that the photographed image is refocusable is added in the file header.

In Step S506, one image file containing the plurality of parallax images, that is, the first parallax image and the second parallax image, which have been acquired in Step S504, and the file header, which has been created in Step S505, is created, and the image file is recorded on the removably mountable recording medium 133. In this manner, the control portion 121 is configured to function as an uncombined image file generation unit configured to record an uncombined image file, which contains the plurality of parallax images obtained from the image pickup element 107, on the recording medium 133.

In Step S507, an image (hereinafter also referred to as "frame") of one frame forming a time-lapse moving image file is created by combining the plurality of parallax images acquired in Step S504. Then, the created time-lapse moving image file is recorded on the removably mountable recording medium 133.

In Step S508, information on the frame created in Step S507 is added to a header of the time-lapse moving image file, and is recorded on the removably mountable recording medium 133. At this time, association information indicating association between the image file created in Step S506 and the frame created in Step S507 is recorded in the header of the time-lapse moving image file. Such association information may be generated by combining a folder number of a folder in which the image file is recorded and a file number of the image file, for example. Alternatively, the same random number may be stored in the header of the image file and the time-lapse moving image file for the association. Such association information may have any configuration as long as the image file and the one frame of the time-lapse moving image file are associated with each other on a one-to-one basis.

In Step S509, it is determined whether or not the number or photographed images has reached a preset predetermined number, and in a case where the number of photographed images has reached the predetermined number (YES in Step S509), the time-lapse photography is ended. On the other hand, in a case where the number or photographed images has not reached the predetermined number (NO in Step S509), the processing returns to Step S503. The predetermined number may be previously set before the photography is started by the user operating the operation switch group 132.

As described above, in this embodiment, in the case of the normal photography mode, that is, in the case where the photography mode is not the time-lapse photography mode, the combined image file obtained by combining the plurality of parallax images is recorded on the recording medium 133. On the other hand, in the case where the photography mode is set to the time-lapse photography mode, the uncombined image file containing the plurality of parallax images is recorded on the recording medium 133. The uncombined image file is not generated in the normal photography mode, and hence according to this embodiment, a capacity of the recording medium 133 may be used effectively. As described above, in this embodiment, at a timing (predetermined timing) when the time-lapse photography mode is turned ON, that at the timing of Step S501, the combined image file generation unit and the uncombined image file generation unit are switched.

Note that, in this example, it is determined in Step S501 whether or not the photography mode is set to the time-lapse photography mode, but the determination performed in Step S501 is not limited to the determination as to whether or not the photography mode is set to the time-lapse photography mode. For example, it may be determined in Step S501 whether or not a photography setting is a macro photography setting. In this case, the time when the photography setting is set to the macro photography setting is the timing at which the combined image file generation unit and the uncombined image file generation unit are switched. In this case, wren the photography setting is set to the macro photography setting, the processing is performed by the uncombined image file generation unit. Alternatively, it may be determined in Step S501 whether or not photography conditions are set to such a condition that a depth of field is shallower than a predetermined depth of field. In this case, the time when it is determined that photography conditions are set to such a condition that the depth of field is shallower than the predetermined depth of field is the timing at which the combined image file generation unit and the uncombined image file generation unit are switched. In this case, when the photography setting is set to such a condition that the depth of field is shallower than the predetermined depth of field, the processing is performed by the uncombined image file generation unit.

[Editing of Time-Lapse Moving Image]

Next, the editing of the time-lapse moving image is described with reference to FIG. 6A to FIG. 8.

First, the editing of the time-lapse moving image is schematically described with reference to FIG. 7. FIG. 7 is a diagram for schematically illustrating the editing of the time-lapse moving image. The image processing apparatus 100 is capable of editing the time-lapse moving image. As illustrated in FIG. 7, a folder named "DCIM", for example, is formed in the recording medium 133, and a folder named "100DIRECT", for example, is formed in the folder named "DCIM". In the folder named "100DIRECT", a moving image (moving image file) 1 and image files (still images) 1, 2, 3, . . . , N, . . . , M are recorded, for example. The moving image 1 is a moving image acquired by the time-lapse photography, that is, a time-lapse moving image. Each of the image files 1, 2, . . . , N, . . . , M contains a plurality of parallax images. The images contained in the image files 1, 2, . . . , N, . . . , M are images in a state in which the refocus processing is not performed, that is, uncombined images.

The moving image 1 contains a plurality of frames. In FIG. 7, the first frame of the moving image 1, that is, a frame 1 of the moving image 1, the second frame of the moving image 1, that is, a frame 2 of the moving image 1, and the third frame of the moving image 1, that is, a frame 3 of the moving image 1 are illustrated. In FIG. 7, the (N−1)th frame of the moving image 1, that is, a frame N−1 of the moving image 1, the N-th frame of the moving image 1, that is, a frame N of the moving image 1, and the (N+1)th frame of the moving image 1, that is, a frame N+1 of the moving image 1 are also illustrated. In FIG. 7, the N-th frame of the moving image 1, that is, a frame M of the moving image 1 is further illustrated.

The image files 1, 2, 3 . . . are image files respectively associated with the frames 1, 2, 3 . . . of the moving image 1. The image files N−1, N, N+1, . . . , M are image files respectively associated with the frames N−1, N, N+1, . . . , M of the moving image 1.

A refocused image N−1 is an image acquired by performing the refocus processing on the plurality of parallax images contained in the image file N−1. A refocused image N is an image acquired by performing the refocus processing on the plurality of parallax images contained in the image file N. A refocused image N+1 is an image acquired by performing the refocus processing on the plurality of parallax images contained in the image file N+1. A refocused image N is an image acquired by performing the refocus processing on the plurality of parallax images contained in the image file M.

A moving image 2 is a moving image generated by performing desired refocus processing on the moving image 1, and is also a time-lapse moving image similar to the moving image 1. Similarly to the moving image 1, the moving image 2 contains a plurality of frames. The first frame of the moving image 2, that is, a frame 1 of the moving image 2 is an image similar to the frame 1 of the moving image 1. The second frame of the moving image 2, that is, a frame 2 of the moving image 2 is an image similar to the frame 2 of the moving image 1. The third frame of the moving image 2, that is, a frame 3 of the moving image 2 is an image similar to the frame 3 of the moving image 1. As the (N−1)th frame of the moving image 2, that is, a frame N−1 of the moving image 2, the refocused image N−1 is used. As the N-th frame of the moving image 2, that is, a frame N of the moving image 2, the refocused image N is used. As the (N+1) th frame of the moving image 2, that is, a frame N+1 of the moving image 2, the refocused image N+1 is used. As the N-th frame of the moving image 2, that is, a frame N of the moving image 2, the refocused image N is used. In this manner, in this embodiment, the frames 1, 2, 3, . . . of the moving image 2, which respectively correspond to the frames 1, 2, 3, . . . of the moving image 1, are not replaced by refocused images. On the other hand, the frames N−1, N, N+1, . . . , M of the moving image 2, which respectively correspond to the frames N−1, N, N+1, . . . , M of the moving image 1, are replaced by the refocused images N−1, N, N+1, . . . , M, respectively.

In this manner, the moving image 2 containing the plurality of frames 1, 2, 3, . . . , N−1, N, N+1, . . . , M is regenerated.

Figure 6A:
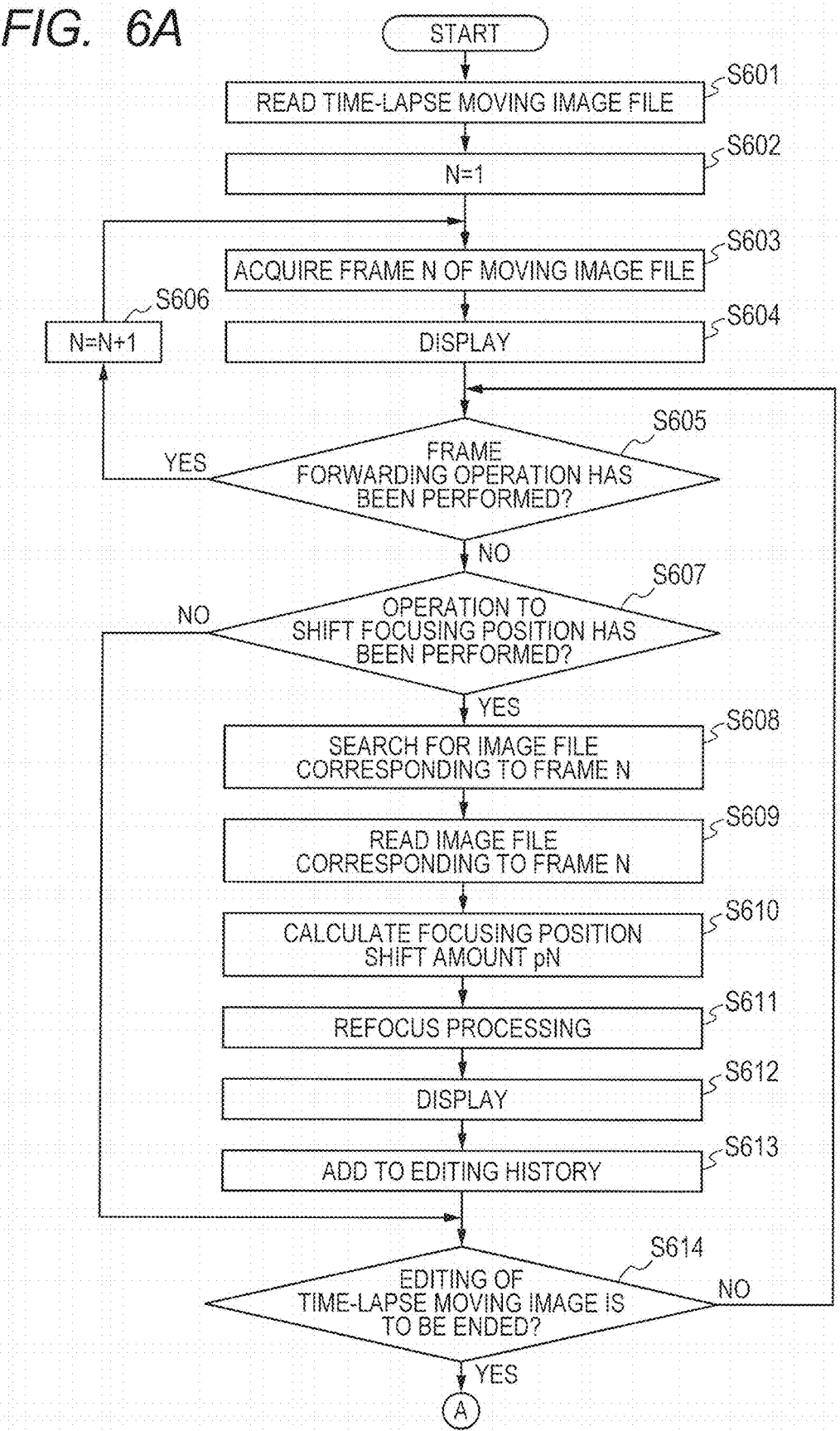
FIGS. 6A and 6B are flow charts for illustrating the operation during the editing of the time-lapse moving image in the image processing apparatus according to the first embodiment.
Figure 6B:
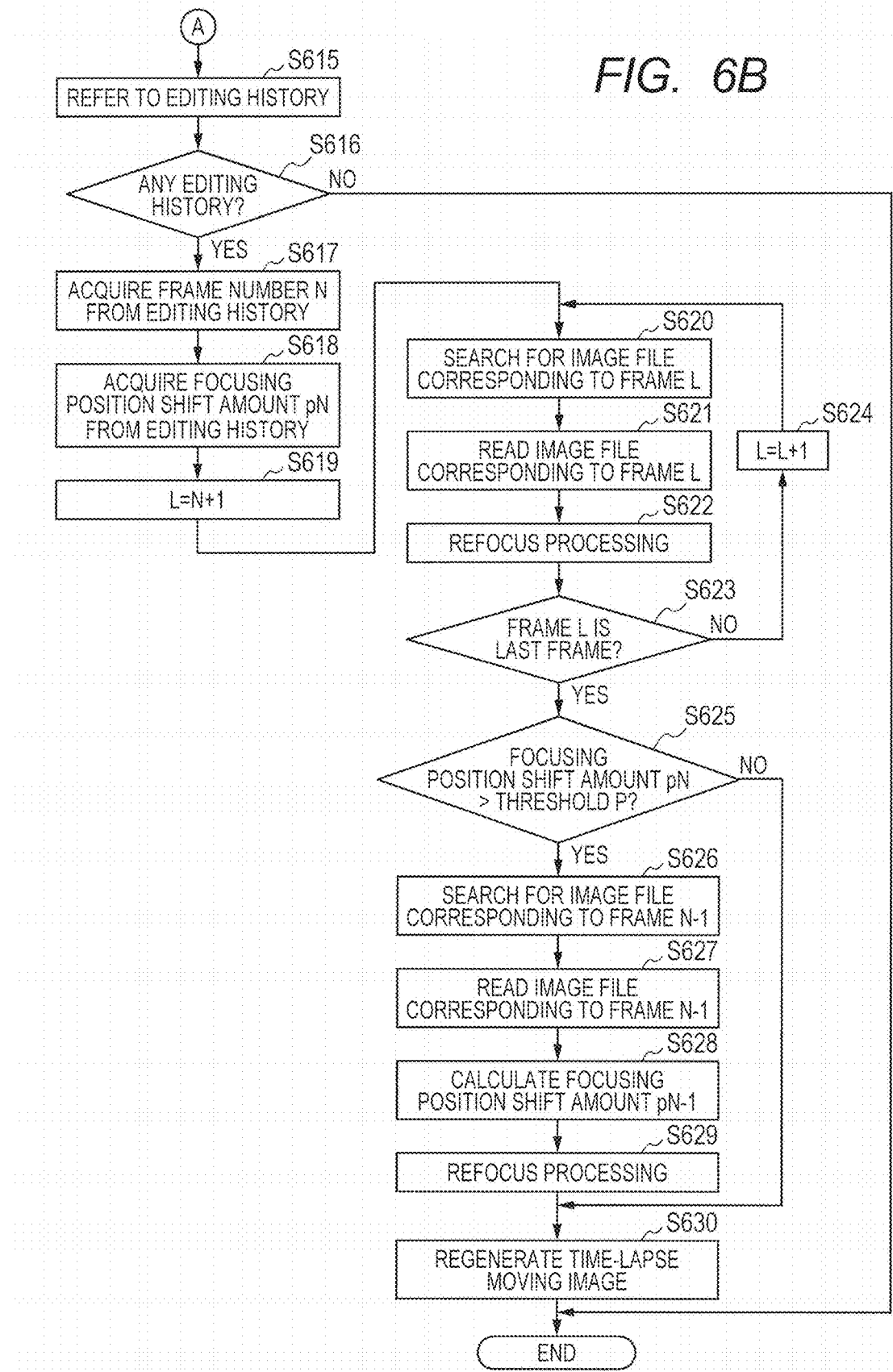

FIG. 6A and FIG. 6B are flow charts for illustrating the editing of the time-lapse moving image. Steps in FIG. 6A and FIG. 6B are executed by the control portion 121 of the image processing apparatus 100 according to this embodiment.

First, in Step S601, the time-lapse moving image file recorded on the removably mountable recording medium. 133 is read.

In Step S602, a control number N for controlling frames forming the time-lapse moving image is reset to 1.

In Step S603, of the plurality of frames forming the moving image 1, the frame N corresponding to the control number N is acquired.

In Step S604, an image of the frame N is displayed on the display device 131.

In Step S605, it is determined whether or not a frame forwarding operation has been performed. In a case where the frame forwarding operation has been performed (YES in Step S605), the control number N is incremented (Step S606), and the processing returns to Step S603. In a case where the frame forwarding operation has not been performed (NO in Step S605), the processing proceeds to Step S607. The frame forwarding operation is performed by the user operating the operation switch group 132.

In Step S607, it is determined whether or not an operation to shift the focusing position, that is, an operation to specify the focusing position has been performed on the frame N of the time-lapse moving image, which is displayed on the display device 131. The operation to shift the focusing position is performed by the user operating the operation switch group 132. In this manner, the operation switch group 132 is configured to function as a focusing position specification unit configured to specify a focusing position of an arbitrary frame of the plurality of frames forming the time-lapse moving image. In a case where the operation to shift the focusing position has been performed (YES in Step S607), the processing proceeds to Step S608. On the other hand, in a case where the operation to shift the focusing position has not been performed (NO in Step S607), the processing proceeds to Step S614.

In Step S608, the image file N corresponding to the frame N is searched for from an image file group (image files 1 to N) recorded on the removably mountable recording medium 133. At this time, the association information may be acquired from information on the header of the frame N, which has been recorded in creating the time-lapse moving image, to recognize which image file of the image file group (image files 1 to N) corresponds to the frame N. Note that, a refocus flag added to the file header of the image file during the time-lapse photography may be checked to determine whether or not the image file is refocusable.

In Step S609, the image file N, which is an image file corresponding to the frame N, is read from the removably mountable recording medium 133 to acquire the plurality of parallax images. In this manner, the control portion 121 is configured to function as a parallax image acquisition unit configured to acquire a plurality of parallax images contained in an image file corresponding to an arbitrary frame of the plurality of frames forming the time-lapse image from the recording medium 133.

In Step S610, a shift amount pN for changing the focusing position to the position specified in Step S607 is calculated based on the plurality of parallax images acquired in Step S609. In this manner, the control portion 121 is configured to function as a shift amount calculation unit configured to calculate a shift amount for shifting the focusing position to focus on the specified focusing position.

In Step S611, the refocus processing is performed. More specifically, the plurality of parallax images are shifted by the shift amount pN calculated in Step S610, and the plurality of shifted parallax images are combined to generate the refocused image N. The generated refocused image N may be given a new file name and recorded on the removably mountable recording medium 133. In this manner, the control portion 121 is configured to function as a refocused image generation unit configured to shift focusing positions of the plurality of parallax images by the desired shift amount, and to combine the plurality of parallax images after the shifting of the focusing positions to generate the refocused images.

In Step S612, the refocused image N obtained by the refocus processing in Step S611 is displayed on the display device 131. In this manner, effects of the refocus processing may be presented to the user.

In Step S613, information on the frame N on which the refocus processing has been performed is recorded as an editing history on the RAM. More specifically, for example, a frame control number (frame number) N and a focusing position shift amount pN are recorded as the editing history on the RAM.

In Step S614, it is determined whether or not to end the editing of the time-lapse moving image. An instruction to end the editing of the time-lapse moving image is performed by the user operating the operation switch group 132. In a case where the editing of the time-lapse moving image is to be ended (YES in Step S614), the processing proceeds to Step S615. On the other hand, in a case where the editing of the time-lapse moving image is not to be ended (NO in Step S614), the processing returns to Step S605.

In Step S615, the editing history recorded on the RAM is referred to, and it is determined whether or not there is any editing history of the time-lapse moving image. In a case where there is an editing history (YES in Step S616), the processing proceeds to Step S617. On the other hand, in a case where there is no editing history (NO in Step S616), the editing of the time-lapse moving image is ended.

In Step S617, information indicating which frame has been shifted in focusing position is acquired from the editing history recorded on the RAM. In other words, the frame control number N, which is the number of the frame that has been refocused, is acquired from the editing history recorded on the RAM. In Step S618, the shift amount pN of the focusing position is acquired from the editing history recorded on the RAM.

In Step S619, a control number L for controlling the frames forming the time-lapse moving image is set to N+1.

In Step S620, similarly to Step S608, the image file N+1 corresponding to the frame L=N+1 is searched for from the image file group (image files 1 to M) recorded on the removably mountable recording medium 133.

In Step S621, similarly to Step S609, the image file N+1 corresponding to the frame N+1 is read from the removably mountable recording medium 133 to acquire the plurality of parallax images. In Step S622, similarly to Step S611, the refocus processing is performed. More specifically, the plurality of parallax images are shifted by the shift amount pN calculated in Step S618, and the combining processing is performed to create the refocused image N+1.

In Step S623, it is determined whether or not the frame L is the last frame of the time-lapse moving image. In a case where the frame L is the last frame (YES in Step S623), the processing proceeds to Step S625. On the other hand, in a case where the frame L is not the last frame (NO in Step S623), the control number L is incremented (Step S624), and the processing returns to Step S620. Such processing is repeated to shift focusing positions of all of the frame N and the subsequent frames, and the refocused images N, N+1, . . . , M respectively corresponding to those frames are obtained. In this manner, the focusing positions of the refocused images N+1, . . . , M are set similarly to the focusing position of the refocused image N.

In Step S625, it is determined whether or not the focusing position shift amount pN is larger than a preset threshold P, that is, a predetermined threshold P. In a case where the focusing position shift amount pN is larger than the threshold P, the processing proceeds to Step S626. On the other hand, in a case where the focusing position shift amount pN is equal to or smaller than the threshold. P, the processing proceeds to Step S630.

In Step S626, similarly to Step S608, an image file corresponding to the frame N−1 is searched for from the image file group (image files 1 to M) recorded on the removably mountable recording medium 133. In Step S627, similarly to Step S609, the image file N−1 corresponding to the frame N−1 read from the removably mountable recording medium 133 to acquire the plurality of parallax images.

In Step S628, a focusing position shift amount pN−1 to be applied to the plurality of parallax images contained in the image file N−1 corresponding to the frame N−1 is calculated. In this example, a value obtained by multiplying the focusing position shift amount pN for the frame N by ½ is the focusing position shift amount pN−1 for the frame N−1.

In Step S629, similarly to Step S611, the plurality of parallax images contained in the image file N−1 corresponding to the frame N−1 are subjected to the refocus processing with the focusing position shift amount pN−1.

In Step S630, an image file group (image files 1, 2, 3 . . . ) and an image file group (refocused images N−1, N, N+1, . . . , M) obtained by the refocus processing, which correspond to the frames of the time-lapse moving image, are used to create the moving image 2. In other words, the image files 1, 2, 3 . . . and the refocused images N−1, N, N+1, . . . , M are used to create respective frames (frames 1 to M) of the moving image 2. In this manner, the moving image 2, which is a time-lapse moving image, is regenerated. In this manner, the control portion 121 is configured to function as a time-lapse moving image generation unit configured to replace desired frames of the time-lapse moving image by the refocused images to regenerate the time-lapse moving image.

Figure 8:
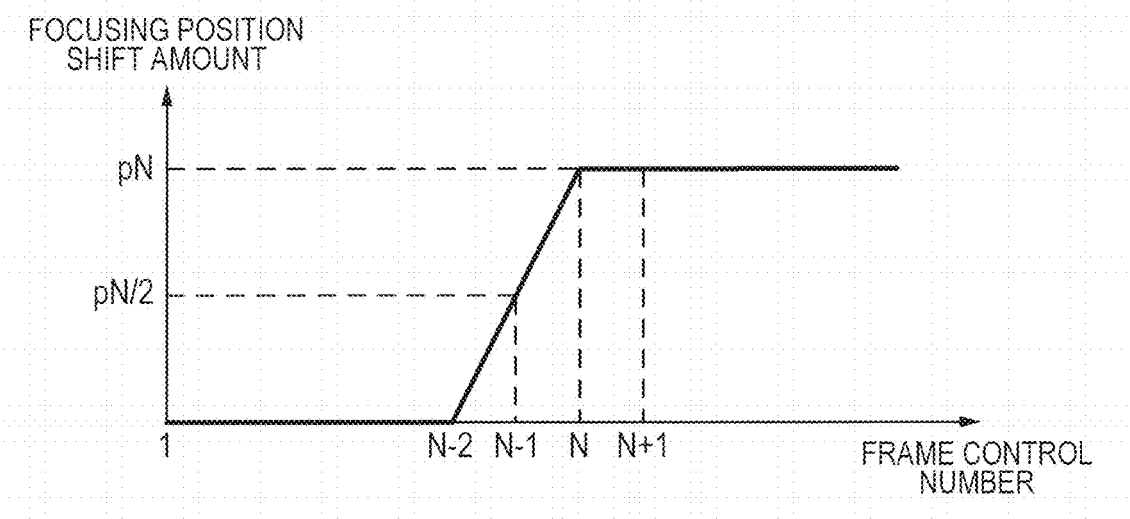
FIG. 8 is a graph for showing a relationship between a frame control number and a focusing position shift amount.

A relationship between a frame control number of a frame that has been subjected to the refocus processing as described above and the focusing position shift amount is described with reference to FIG. 8. FIG. 8 is a graph for showing the relationship between the frame control number and the focusing position shift amount. The horizontal axis indicates the frame control number, and the vertical axis indicates the focusing position shift amount.

For frames having frame control numbers of from 1 to N−2, the focusing position is not changed from the start of the photography, and hence the focusing position shift amount is 0. A focusing position shift amount at the frame control number N−1 is pN/2, which is half of the focusing position shift amount pN at the frame control number N. Frames having frame control numbers of from N to the last number have the focusing position shift amount of pN.

As described above, according to this embodiment, a plurality of image files (image files 1 to M), each of which contains a plurality of parallax images, are recorded on the recording medium 133 in association with the plurality of frames (frames 1 to M) forming the time-lapse image, respectively. Therefore, according to this embodiment, after the photography of the time-lapse moving image is complete, an arbitrary frame N may be refocused on a desired focusing position. Then, the frames N+1, . . . , M, which are acquired after the frame N, may be refocused on a focusing position similar to the focusing position of the frame N.

In addition, according to this embodiment, the frame N−1, which is acquired before the frame N, is shifted in focusing position by the focusing position shift amount pN/2, which is smaller than the focusing position shift amount pN for the frame N, and hence the images may be prevented from being changed unnaturally.

Note that, the case where the refocus processing with the small shift amount pN/2 is performed only on the frame N−1, which is a frame immediately preceding the frame N, has been exemplified above, but the present invention is not limited thereto. For example, the refocus processing with a shift amount smaller than pN may be performed on a plurality of frames. The number of frames on which the refocusing with the shift amount smaller than pN is performed may be specified by the user. Moreover, the shift amount may be changed gradually. For example, a shift amount for the frame N−2 may be (⅓)×pN, and a shift amount for the frame N−1 may be (⅔)×pN.

Second Embodiment

An image processing apparatus, an image processing method, and a computer program according to a second embodiment are described with reference to FIG. 9A to FIG. 10. The same components as those of the image processing apparatus according to the first embodiment illustrated in FIG. 1 to FIG. 8 are denoted by the same reference symbols, and a description thereof is omitted or simplified.

The image processing apparatus according to this embodiment is capable of performing the refocusing on the plurality of frames. The basic structure of the image processing apparatus according to this embodiment similar to that of the image processing apparatus according to the first embodiment described above with reference to FIG. 1, and hence a description thereof is omitted.

Figure 9A:
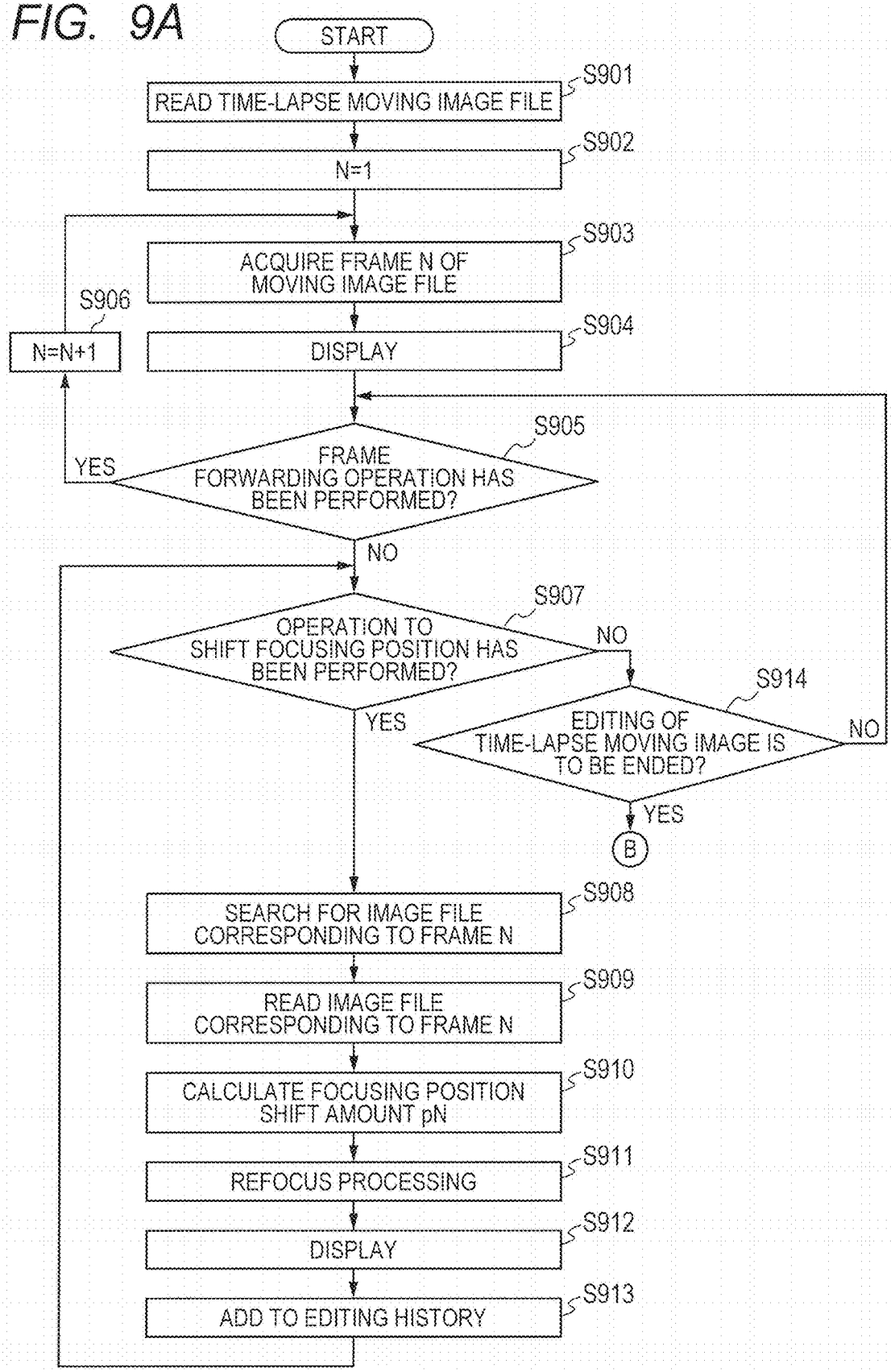
FIGS. 9A and 9B are flow charts for illustrating the operation during the editing of the time-lapse moving image in the image processing apparatus according to the second embodiment.
Figure 9B:
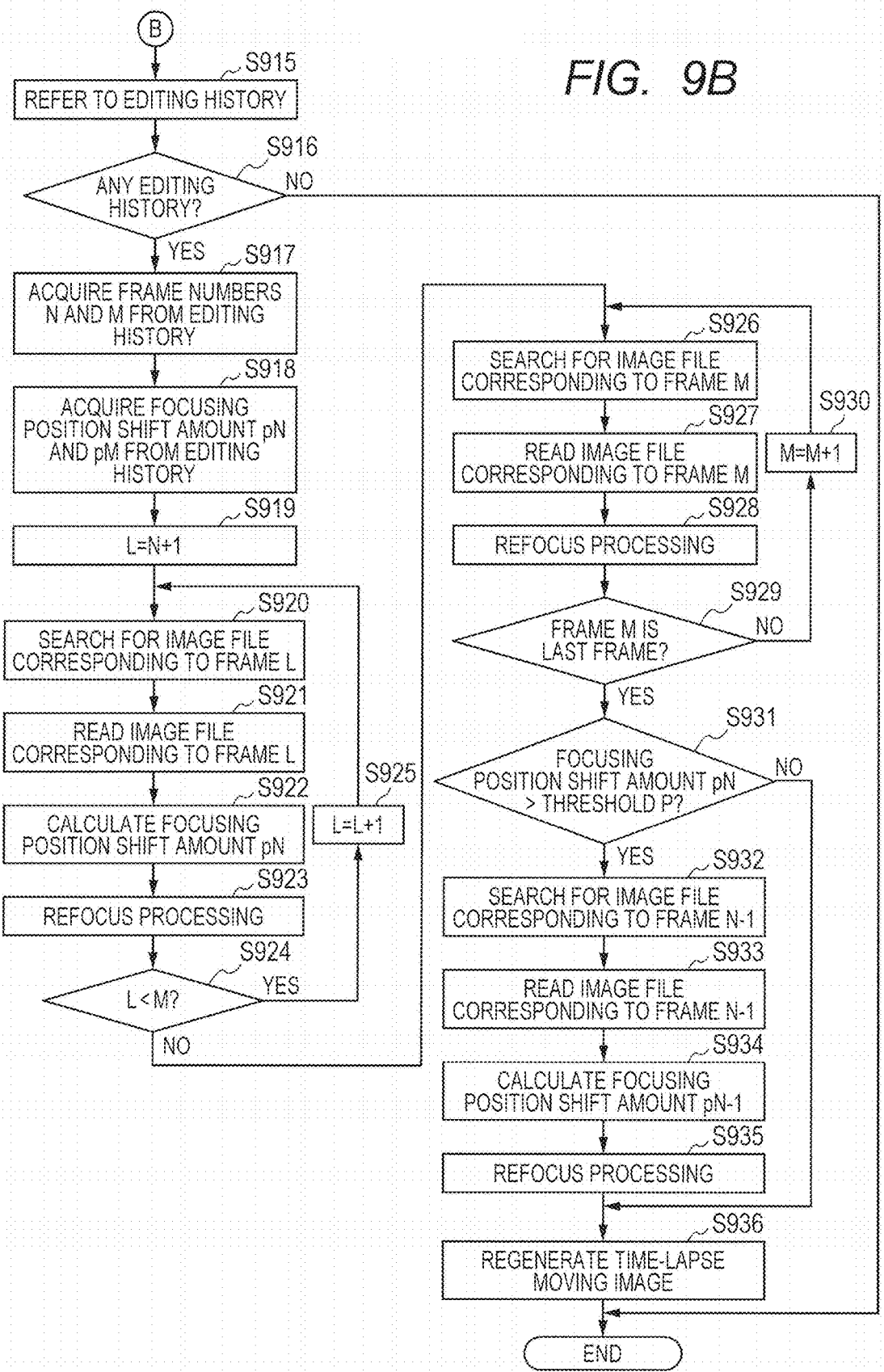
Figure 10:
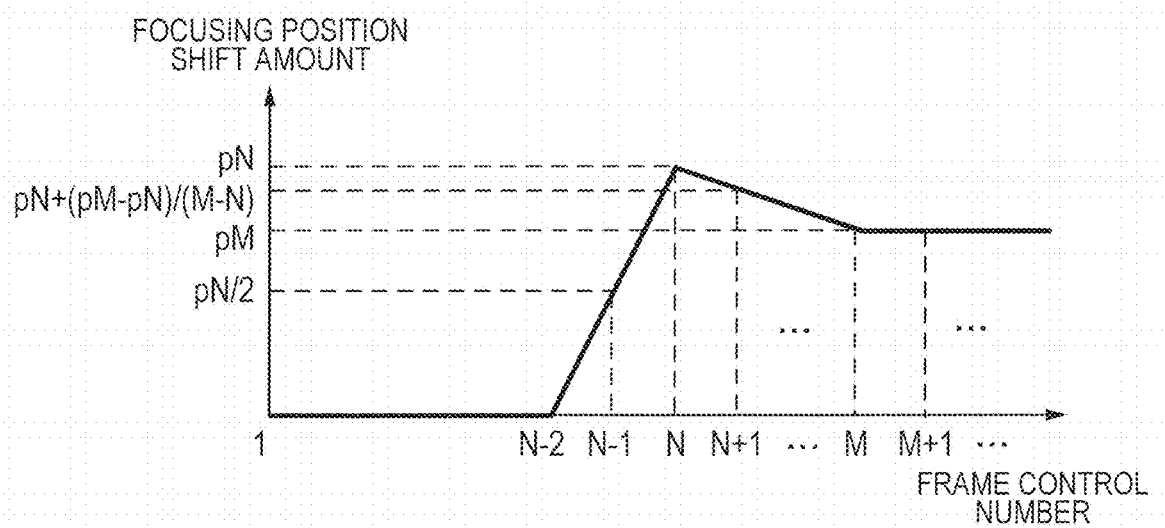
FIG. 10 is a graph for showing a relationship between a frame control number and a focusing position shift amount.

FIG. 9A and FIG. 9B are flow charts for illustrating editing of the time-lapse moving image in the image processing apparatus according to this embodiment. Steps illustrated. In FIG. 9A and FIG. 9B are performed by the control portion 121 of the image processing apparatus 100 according to this embodiment.

First, Step S901 to Step S912 are similar to Step S601 to Step S612 described above in the first embodiment, and hence a description thereof is omitted.

In Step S913, information on the frame N, on which the refocus processing is performed, for example, the frame control number N and the focusing position shift amount pN are recorded as the editing history on the RAM, and the processing returns to Step S907. Step S913 is executed before returning to Step S907, and hence the user may perform the operation to shift the focusing position on a plurality of frames.

Step S914 to Step S916 are similar to Step S614 to Step S616 described above in the first embodiment, and hence a description thereof is omitted.

In Step S917, information indicating on which frame the operation to shift the focusing position has been performed is acquired from the editing history recorded on the RAM. When the operation to shift the focusing position has been performed on the frame N and the frame M, numbers of the frames on which the refocusing has been performed, that is, the frame control number N and the frame control number M are acquired from the editing history recorded on the RAM.

In Step S918, the focusing position shift amount is acquired from the editing history recorded on the RAM. For example, the focusing position shift amount pN by which the frame N has been shifted, and a focusing position shift amount pM by which the frame M has been shifted are acquired.

In Step S919, the control number L for controlling the frames forming the time-lapse moving image is set to N+1.

In Step S920, similarly to Step S908, the image file N+1 corresponding to the frame L=N+1 is searched for from the image file group (image files 1 to M) recorded on the removably mountable recording medium 133.

In Step S921, similarly to Step S909, the image file N+1 corresponding to the frame L=N+1 is read from the removably mountable recording medium 133 to acquire the plurality of parallax images.

In Step S922, similarly to Step S910, a focusing position shift amount pL for the frame L corresponding to the control number L=N+1 is calculated. The focusing position shift amount pL is determined, based on the focusing position shift amount pN and the focusing position shift amount pM, which have been acquired in Step S918, by the following expression (1), for example.

$$pL=pN+(pM-pN)/(M-N)\,M>0,N>0,M>N \quad (1)$$

In Step S923, the refocus processing is performed with the focusing position shift amount pit calculated in Step S922.

In Step S924, the control number L and a control number M are compared in terms of magnitude. In a case where the control number L is not smaller than the control number M (NO in Step S924), the processing proceeds to Step S926. On the other hand, in a case where the control number L is smaller than the control number M (YES in Step S924), the control number L is incremented (Step S925), and the processing returns to Step S920. Such processing may be repeated to obtain the refocused images (not shown), in which the focusing positions are shifted, for all frames between the frame N and the frame M.

Step S926 to Step S930 are similar to the processing of from Step S620 to Step S624 described above in the first embodiment. Note that, the control number in Step S620 to Step S624 described above in the first embodiment are replaced by the control number M in Step S926 to Step 3930. In other words, in Step S926, similarly to Step S620, the image file M corresponding to the frame M is searched for from the image file group (image files 1 to M) recorded on the removably mountable recording medium 133. In Step S927, similarly to Step S621, the image file M corresponding to the frame M is read from the removably mountable recording medium 133 to acquire the plurality of parallax images. In Step S928, similarly to Step S622, the refocus processing is performed. More specifically, the plurality of parallax images are shifted by the shift amount pM calculated in Step S918, and the combining processing is performed to create the refocused image M. In Step S929, similarly to Step S623, it is determined whether or not the frame M is the last frame. In Step S930, similarly to Step S624, the control number M is incremented.

Step S931 to Step S936 are similar to Step S625 to Step S630 described above in the first embodiment, and hence a description thereof is omitted.

A relationship between the frame control number and the focusing position shift amount of the time-lapse moving image, which is obtained by performing the refocus processing as described above, is described with reference to FIG. 10. FIG. 10 is a graph showing the relationship between the frame control number and the focusing position shift amount. The horizontal axis indicates the frame control number, and the vertical axis indicates the focusing position shift amount.

For frame control numbers 1 to N−2, the focusing position is not changed from the start of the photography, and hence the focusing position shift amount is 0. A focusing position shift amount at the frame control number N−1 is pN/2, which is half of the focusing position shift amount pN at the frame control number N. Frames having frame control numbers of from N to M have focusing position shift amounts calculated by the expression (1) or the like based on the focusing position shift amounts pN to pM, respectively. In other words, the focusing position shift amounts for the frames having the frame control numbers between N and M have values between pN and pM. Frames having frame control numbers of from M to the last number have the focusing position shift amount of pM.

As described above, according to this embodiment, the refocusing may be performed on the plurality of frames after the time-lapse photography is ended.

In addition, according to this embodiment, the focusing position shift amounts for the frames between the frame N and the frame N are set to values between the focusing position shift amount for the frame N and the focusing position shift amount for the frame M. Therefore, also in this embodiment, the images may be prevented from being changed unnaturally.

Note that, in this embodiment, the case where the operation of shifting the focusing position is performed on two frames has been exemplified, but the number of frames on which the operation of shifting the focusing position is performed not limited to two. For example, the operation of shifting the focusing position may be performed on three or more frames. Also in the case where the operation of shifting the focusing position is performed on three or more frames, processing similar to that described above may be repeated as appropriate to obtain refocused time-lapse images.

The exemplary embodiments of the present invention are described above, but the present invention is not limited to those embodiments and can be modified and changed variously within the scope of the gist thereof.

Other Embodiments

Embodiment(s) of the present invention can also be realized by a computer or a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more the above-described embodiment(s) and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope the following claims is to be accorded the broadest interpretation so as to encompass all such modifications and equivalent structures and functions.

This application claims the benefit of Japanese Patent Application No. 2015-099419, filed May 14, 2015, which is hereby incorporated by reference herein in its entirety.

What is claimed is:

1. An image processing apparatus for generating a time-lapse moving image by using time series parallax images picked up with different viewpoints for a plurality of frames, the image processing apparatus comprising:
    a specification unit configured to specify a focusing position for one frame of a plurality of frames;
    an image generation unit configured to generate a refocus image focused at a virtual focusing position in one frame by relatively shifting and combining the first and second parallax images corresponding to the one frame; and a moving image generation unit configured to generate a time-lapse moving image of the plurality of frames including in the frame the refocus image generated by the image generation unit, wherein, in the case where a focusing position in the first frame is specified by the specification unit, the image generation unit relatively shifts the first and second parallax images corresponding to the first frame with a first shift amount corresponding to the focusing position specified by the specification unit, generates a first refocus image by combining the shifted first and second parallax images, relatively shifts a third and fourth parallax images corresponding to a second frame prior to the first frame with a second shift amount smaller than the first shift amount, and generates a second refocus image by combining the shifted third and fourth parallax images, wherein the moving image generation unit generates a time-lapse moving image including the first and second refocus images.

2. The image processing apparatus according to claim 1, wherein the image generation unit relatively shifts a fifth and sixth parallax images corresponding to a third frame subsequent to the first frame, and generates a third refocus image by combining the shifted fifth and sixth parallax images, and wherein the moving image generation unit generates a time-lapse moving image further including the third refocused image.

3. The image processing apparatus according to claim 1, wherein, in the case where a focusing position in a third frame subsequent to the first frame is specified by the specification unit, the image generation unit relatively shifts a fifth and sixth parallax images corresponding to the third frame with a third shift amount corresponding to the focusing point specified by the specification unit, and generates a third refocus image by combining the shifted fifth and sixth parallax images, and wherein the moving image generation unit generates the time-lapse moving image further including the third refocused image.

4. The image processing apparatus according to claim 3, wherein the image generation unit relatively shifts a seventh and eighth parallax images corresponding to a fourth frame subsequent to the frame and prior to the third frame with a fourth shift amount between the first shift amount and the third shift amount, and generate a fourth refocus image by combining the shifted seventh and eighth parallax images, and wherein the moving image generation unit generates the time-lapse moving image further including the fourth refocused image.

5. The image processing apparatus according to claim 1, wherein the image generation unit generates the second refocused image only in the case where the first shift amount is larger than a predetermined threshold, and wherein the moving image generation unit generates the time-lapse moving image including the second refocused image only in the case where the first shift amount is larger than the predetermined threshold.

6. The image processing apparatus according to claim 1, further comprising:

an image pickup element including an array of a plurality of pixels each including a plurality of subpixels, which are configured to receive light fluxes passing through different partial pupil regions of an imaging optical system;

a combined image file generation unit configured to record a combined image file, which is formed by combining a plurality of parallax images obtained from the image pickup element, on the recording medium; and an uncombined image file generation unit configured to record an uncombined image file, which contains the plurality of parallax images obtained from the image pickup element, on the recording medium, wherein the combined image file generation unit and the uncombined image file generation unit are switched according to whether or not a predetermined condition is satisfied.

7. The image processing apparatus according to claim 6, wherein the predetermined condition is whether or not a photographing mode is a photographing mode in which a time-lapse moving image is photographed, and wherein, in the case where the photographing mode is the photographing mode in which the time-lapse moving image is photographed, the uncombined image file is generated by the uncombined image file generation unit.

8. The image processing apparatus according to claim 6, wherein the predetermined condition is whether or not a photography setting is a macro photography setting, and wherein, in the case where the photography setting is the macro photography setting, the uncombined image file is generated by the uncombined image file generation unit.

9. The image processing apparatus according to claim 6, wherein the predetermined condition is where or not a depth of field is shallower than a predetermined depth of field, and wherein, in the case where the depth of field is shallower than the predetermined depth, the uncombined image file is generated by the uncombined image file generation unit.

10. An image processing method comprising:

specifying a focusing position for one frame of a plurality of frames forming a time-lapse moving image generated by using time series parallax images picked up with different viewpoints for a plurality of frames;

generating a refocus image focused at a virtual focusing position in one frame by relatively shifting and combining the first and second parallax images corresponding to the one frame; and generating a time-lapse moving image of the plurality of frames including in the frame the refocus image, wherein, in the case where a focusing position in the first frame is specified in the specifying, in the generating the refocus image, the first and second parallax images corresponding to the first frame are relatively shifted with a first shift amount corresponding to the focusing position specified in the specifying, a first refocus image is generated by combining the shifted first and second parallax images, a third and fourth parallax images corresponding to a second frame prior to the first frame is relatively shifted with a second shift amount smaller than the first shift amount, and a second refocus image is generated by combining the shifted third and fourth parallax images, wherein in the generating the time-lapse moving image, a time-lapse moving image including the first and second refocus images is generated.

11. A non-transitory computer-readable storage medium storing a program for causing a computer to execute:

specifying a focusing position for one frame of a plurality of frames forming a time-lapse moving image generated by using time series parallax images picked up with different viewpoints for a plurality of frames;

generating a refocus image focused at a virtual focusing position in one frame by relatively shifting and combining the first and second parallax images corresponding to the one frame; and generating a time-lapse moving image of the plurality of frames including in the frame the refocus image, wherein, in the case where a focusing position in the first frame is specified in the specifying, in the generating the refocus image, the first and second parallax images corresponding to the first frame are relatively shifted with a first shift amount corresponding to the focusing position specified in the specifying, a first refocus image is generated by combining the shifted first and second parallax images, a third and fourth parallax images corresponding to a second frame prior to the first frame is relatively shifted with a second shift amount smaller than the first shift amount, and a second refocus image is generated by combining the shifted third and fourth parallax images, wherein in the generating the time-lapse moving image, a time-lapse moving image including the first and second refocus images is generated.

* * * * *